United States Patent [19]

Schieve et al.

[11] Patent Number: 5,455,933
[45] Date of Patent: Oct. 3, 1995

[54] CIRCUIT AND METHOD FOR REMOTE DIAGNOSIS OF PERSONAL COMPUTERS

[75] Inventors: Eric Schieve; Richard Finch, both of Austin, Tex.

[73] Assignee: Dell USA, L.P., Austin, Tex.

[21] Appl. No.: 92,316

[22] Filed: Jul. 14, 1993

[51] Int. Cl.$^6$ .................................................. G06F 11/00
[52] U.S. Cl. ........................ 395/183.03; 371/20.1; 395/183.12; 395/183.2; 395/892
[58] Field of Search ............................. 395/575, 200, 395/275, 700; 371/16.1, 20.1, 22.5; 364/267, 943.9

[56] References Cited

U.S. PATENT DOCUMENTS

| | | | |
|---|---|---|---|
| 4,837,764 | 6/1989 | Russello | 371/20 |
| 5,179,695 | 1/1993 | Derr et al. | 395/575 |
| 5,325,529 | 6/1994 | Brown et al. | 395/700 |
| 5,357,519 | 10/1994 | Martin et al. | 371/15.1 |

*Primary Examiner*—Vincent P. Canney
*Attorney, Agent, or Firm*—David Hitt; James Huffman

[57] ABSTRACT

Disclosed are a circuit and method for remote diagnosis of personal computers. The method comprises the steps of (1) confirming an existence and a proper operation of a modem coupled to the personal computer, the step of confirming performed in a central processing unit ("CPU") of the personal computer and in a diagnostic environment independent of a normal operating system of the personal computer, (2) receiving an indication of a selection of diagnostic routines to be performed from a remote location via the modem and (3) performing selected ones of the diagnostic routines as a function of the selection. The present invention allows an experienced technician located remotely from the computer to interact as though seated in front of it, to thereby allow remote diagnosis of even critical faults that prevent the computer from booting.

22 Claims, 5 Drawing Sheets

CIRCUIT AND METHOD FOR REMOTE DIAGNOSIS OF PERSONAL COMPUTERS

CROSS-REFERENCE TO RELATED APPLICATION

This application is related to Ser. No. 8/91,548 entitled "SYSTEM AND METHOD FOR LOADING COMPRESSED EMBEDDED DIAGNOSTICS", commonly assigned herewith and incorporated herein by reference.

TECHNICAL FIELD OF THE INVENTION

The present invention is directed, in general, to diagnostics and, more specifically, to a method and apparatus for allowing remote diagnosis of critical faults occurring in personal computers.

BACKGROUND OF THE INVENTION

Immeasurable gains in technology offered in personal computers ("PCs") have allowed PCs to assume roles performed in the past only by mainframe or minicomputers. Many companies and individual users rely solely on commercially-available PCs to meet their information processing needs. Thus, it is vital that their PCs perform reliably. If, however, a PC experiences a fault, it is equally vital that the PC communicate existence of the fault. This informs the user of a need to repair the fault so the PC can return to active service. For computer systems in general, it is most helpful for the computer system to provide an indication of the specific location and nature of a fault to help the user quickly isolate and economically repair the fault. To that end, current PCs are typically equipped with some form of internal diagnostics, the purpose of which is to detect and isolate component faults within the PC architecture.

Diagnostic routines consist of a series of instructions executed by a central processing unit ("CPU") within a computer system to allow self-diagnosis. In the past, some computers have been provided with diagnostic routines that test and report on the operational status or functionality of components within the computer, allowing an interested party to repair or replace components that are not functioning to the desire degree.

Diagnostic code is sometimes stored on disk and retrieved therefrom for execution by the CPU (so-called disk-based diagnostics). One advantage of disk-based diagnostics is that disks provide a relatively large area in which to store code, allowing diagnostic routines to be relatively sophisticated and thorough in their testing and reporting. Unfortunately, diagnostic routines are frequently invoked when components in the computer are not completely functional. To successfully retrieve and execute disk-based diagnostics, the following components must be fully functional: CPU, address and data buses, bus controller, disk drive controller, disk drive and keyboard. If any significant information is to be relayed back to the user, a display device or a printer and their associated interface hardware must also be functional. It is apparent therefore that if any one of these components is not fully functional, the diagnostics may not execute or interact with the user properly.

One solution to the above-noted problem with disk-based diagnostics was solved in part by embedding diagnostic code in solid state, non-volatile memory within the computer. Thus, read-only memory ("ROM"), for instance, was employed to store diagnostic code as firmware. One type of embedded diagnostics is power-on self-test ("POST") diagnostics, generally stored in basic input-output system ("BIOS") ROM in PCs. POST is a series of tests that the computer performs on its components each time the computer is turned on. POST begins by reading system configuration information that has either been hard-wired or stored in non-volatile memory. It then checks random access memory ("RAM") by writing to and reading from the RAM to insure proper operation. POST next examines the disk drives to confirm that they match the system configuration information. Lastly, POST initiates the loading of the operating system, "booting" the computer. Failure during execution of POST indicates presence of a fault within the computer. However, POST does not always provide a clear indication of the specific nature of the fault. Instead, the user must run diagnostic software to further isolate the fault. Each phase of the POST routine involves a check of the computer system's major components: the CPU, the main and cache memory subsystems, the video subsystem, the buses and certain peripherals, such as the hard and floppy disk drives.

In contrast to disk-based diagnostics, embedded (or ROM-based) diagnostics require the following components to function: CPU, address and data buses and bus controller. Again, if any significant information is to be relayed back to the user, a display device or printer and associated interface hardware must also be fully functional. Although ROM-based diagnostics are typically required to fit within a smaller space and therefore do not have the luxury of being as thorough in testing as disk-based diagnostics, it is apparent that fewer components need be functional to successfully retrieve and execute embedded diagnostics.

Serial No. (DC-00328) discloses a system for loading compressed embedded diagnostic routines. Given the relatively limited space within non-volatile memory, embedded diagnostic routines decompressed and paged into volatile memory as required enjoy a distinct advantage over more traditional diagnostic processes. The embedded diagnostic routines allow local diagnosis of faults as severe as non-bootable faults (defined as faults so critical that the PC is unable to boot and operate under its normal operating system).

As PC systems become more and more complex and as users increasingly come to rely on the services of skilled technical personnel to maintain and repair their PCs, it is growing less favorable to force the user to diagnose PC faults. The general direction in the development of diagnostic software systems to this point has been to isolate the user somewhat from the intricate and technically complex operations of diagnostic routines by presenting a user-friendly interface written in clear English text and presented in an aesthetically pleasing manner. However, the user is still forced to (1) interact with the diagnostic routines, (2) report findings to a remote technician and (3) take actions under direction of the remote technician. This usually results in an iterative approach, wherein the user's inexperience forces the remote technician to proceed laboriously through the diagnostics process, considering all possibilities. This is in contrast to the more efficient process an experienced technician undergoes when directly in control of the PC. This is because the technician's experience allows faster diagnosis. The user, who in general has no interest in being involved with the diagnostics process, is in fact both the focus and the bottleneck.

There are three possible solutions to the above-noted problem. First, the technician can travel to the computer to physically sit in front of it. However, this is a great waste of the technicians' time and frequently removes the technician from technical resources, such a repair manuals and online help, that are available at the technical support center. Second, the PC can be supplied with dedicated diagnostic hardware. This is not only expensive, rendering the PC as a whole relatively noncompetitive in terms of its price, but is frequently a wasteful duplication of hardware, as the diagnostic hardware comes into use only infrequently. Third, the remote technician can perform remote diagnostics via communications software running in conjunction with traditional disk-based diagnostics, all executing under the PC's normal operating system. Unfortunately, as detailed above, this third option is only available when the PC is substantially operable and bootable and not when the PC has suffered a non-bootable fault.

A system and method for allowing remote diagnosis of PCs, even those suffering non-bootable faults, by a remote technician that are cost and hardware efficient are acutely needed in the art. Unfortunately, remote diagnosis requires certain components within the PC to be fully functional, namely a modem and its associated interface hardware, such as a universal asynchronous receive/transmit module ("UART"). More conventional prior art, disk-based methods of accessing and using the modem require many hardware components and access to the PC's normal operating system to function as detailed above. Accordingly, there is, in particular, a need in the art for a method of providing for remote diagnosis in PCs and the like that requires a minimal amount of fully functioning hardware and software to operate so that even non-bootable faults can be remotely diagnosed.

SUMMARY OF THE INVENTION

It is therefore an object of the present invention to provide a means by which to remotely diagnose personal computer faults of all types, including, but not limited to, non-bootable faults. Another important object of the present invention is to require as few PC modifications or additions as possible in accomplishing the above, so as to minimize cost and parts count.

Accordingly, to address the above-noted deficiencies in the prior art, the present invention advantageously provides a method of remotely diagnosing faults on a PC comprising the steps of (1) confirming an existence and a proper operation of a modem coupled to the PC, the step of confirming performed in a CPU of the PC and in a diagnostic environment independent of a normal operating system of the PC, (2) receiving an indication of a selection of diagnostic routines to be performed from a remote location via the modem and (3) performing selected ones of the diagnostic routines as a function of the selection.

The first object is met by providing an independent diagnostic operating system (one that is embedded in non-volatile memory and that does not depend on the existence or proper functioning of the PC's main operating system—DOS, in most cases). Accordingly, the method of the present invention comprises the step of executing a diagnostic operating environment prior to the step of confirming, the diagnostic operating environment independent of the normal operating system and capable of visually communicating information pertaining to diagnostics of the PC to a user.

The second object is met by employing the PC's CPU, modem and other hardware in the diagnostics process, rather than providing dedicated diagnostic hardware that is separate from the system. Of course, this hardware must be tested prior to its use so its performance can be trusted. This is the job of an initial diagnostic routine stored in non-volatile memory. Accordingly, the method of the present invention comprises the step of executing an initial diagnostic routine prior to the step of confirming, the initial diagnostic routine performing tests on the CPU and other selected core components within the PC.

Core components are logically proximate the CPU and include timers, the programmable interrupt controller and the video subsystem, including video random access memory ("VRAM"), in which the diagnostic code of the present invention can be temporarily stored to advantage. These core components are necessary to operate the diagnostic routines of the present invention. Core components, such as the cache memory subsystem and the main memory subsystem and peripheral components, such as the disk drives and their associated controllers are not necessary to support execution of the diagnostic routines, although they may be the subject of diagnostic testing.

As previously mentioned, the present invention requires the presence and proper functioning of the PC's modem for remote diagnosis to take place. The modem is coupled to the CPU via a universal asynchronous receive/transmit module ("UART"). Accordingly, the method of the present invention further comprises the step of confirming the existence and proper operation of the UART and a programmable interrupt controller ("PIC") prior to allowing remote diagnosis.

In a preferred embodiment, the present invention employs menus, or lists of options, to allow a user to select, among various options presented, those that are to be performed. Accordingly, the method of the present invention further comprises the step of locally presenting, prior to the step of receiving and via the diagnostic environment, a list of options for further diagnostic routines to be executed, one of the options being remote diagnosis.

It is of no benefit to present a list containing an option that cannot be performed. Accordingly, the method of the present invention provides that the remote diagnosis option is only presented when the UART, the PIC and the modem are present and fully functional.

Once the user has chosen the remote diagnosis option and a remote link has been established, the user is no longer able to control the diagnostics process: control rests solely in the remote technician. In a preferred embodiment, the method of the present invention further comprises the step of remotely presenting, prior to the step of receiving and via the diagnostic environment and the modem, the list of options to the remote technician. This allows the remote technician to select the routines to be executed, overriding any choices the user may have previously made.

Of course, another object of the present invention is to allow the remote technician to view and evaluate the results of the tests performed. Accordingly, a preferred embodiment of the method of the present invention further comprises the step of remotely presenting, subsequent to the step of performing and via the diagnostic environment and the modem, information pertaining to execution of the selected ones of the diagnostic routines.

In accordance with the above-described objects and features, a preferred embodiment of the present invention also encompasses a system for remote diagnosis of a personal computer comprising (1) non-volatile memory within the personal computer containing a diagnostic operating environment, the diagnostic operating environment independent of a normal operating system of the personal computer and capable of visually communicating information pertaining to diagnostics of the personal computer to a user, (2) a CPU coupled to the non-volatile memory and capable of executing an initial diagnostic routine, the initial diagnostic routine performing tests on the CPU and other selected core components within the personal computer, the initial diagnostic routine further confirming an existence and a proper operation of a modem coupled to the personal computer, (3) a display device capable of locally presenting, via the diagnostic operating environment, a list of options for further diagnostic routines to be executed, one of the options being remote diagnosis and (4) a remote link including the modem and capable of remotely presenting, via the diagnostic operating environment, the list of options, the diagnostic operating environment receiving an indication of a selection of diagnostic routines to be performed from a remote location via the modem, the CPU performing selected ones of the diagnostic routines as a function of the selection, the diagnostic operating environment remotely presenting, via the diagnostic operating environment and the modem, information pertaining to execution of the selected ones of the diagnostic routines.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily used as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Figure 1:
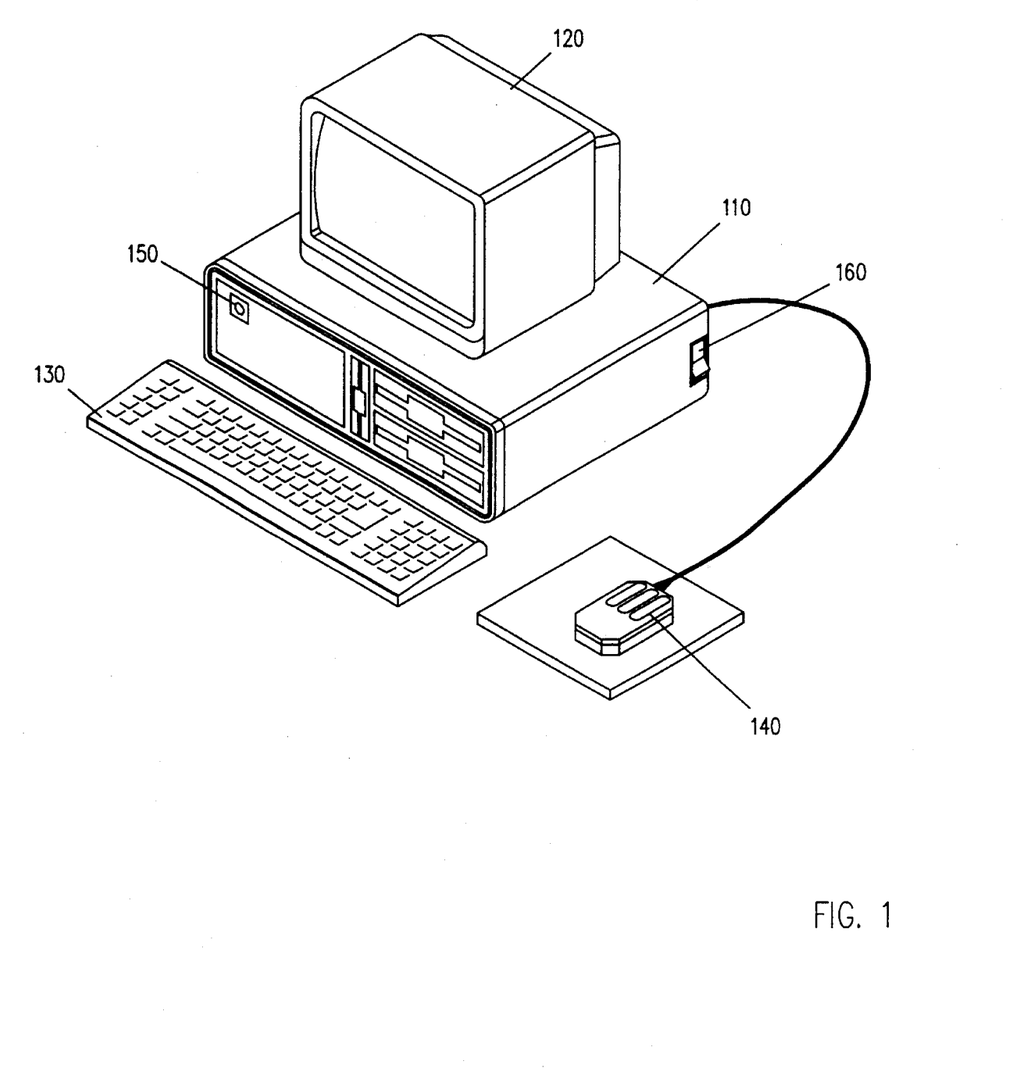
FIG. 1 illustrates an isometric view of a personal computer providing an environment within which the present invention operates.

FIG. 1 illustrates an isometric view of a personal computer ("PC") providing an environment within which the present invention operates. The PC comprises a main chassis 110, a video display or monitor 120, a keyboard 130 and a pointing device or "mouse" 140 residing on a mouse pad (not referenced). The main chassis 110 contains the PC's microprocessor, its memory and video subsystems and all other computing circuitry, for that matter. These are not shown in FIG. 1, because they are internal to the main chassis 110. However, these are represented in detail in FIG. 2. The main chassis 110 is also shown as having a reset button 150 and an on-off power switch 160.

The reset button 150 traditionally causes the PC to reboot, invoking conventional BIOS POST diagnostics and reinitializing the PC's operating system. However, Ser. No. 08/034,056, filed on Mar. 22, 1993 and entitled "PERSONAL COMPUTER EMPLOYING RESET BUTTON TO ENTER ROM-BASED DIAGNOSTICS" is directed to use of a double-press of the reset button 150 to invoke embedded diagnostic routines. Thus, in a preferred embodiment, the reset button 150 is used in such a manner to invoke the present invention. Those skilled in the art should realize that a dedicated diagnostics switch can perform the same function; the manner in which the diagnostic routines of the present invention are entered is not pertinent to the present invention itself. Entry should be as software and hardware independent as possible, so as to keep the diagnostics routines as free as possible from being dependent on the proper functioning of the PC's components.

Figure 2:
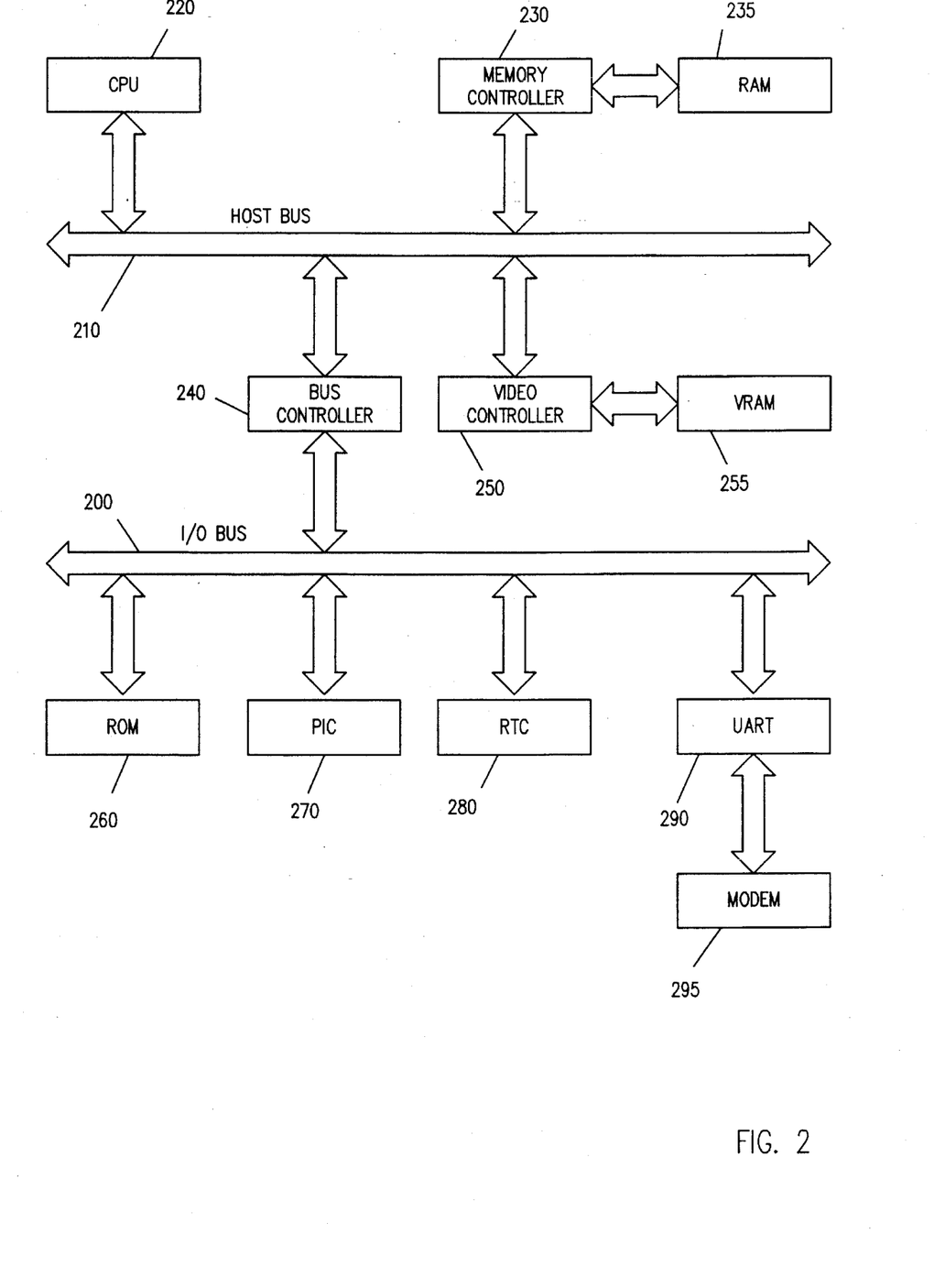
FIG. 2 illustrates a partial block diagram of a personal computer architecture.
Figure 3:
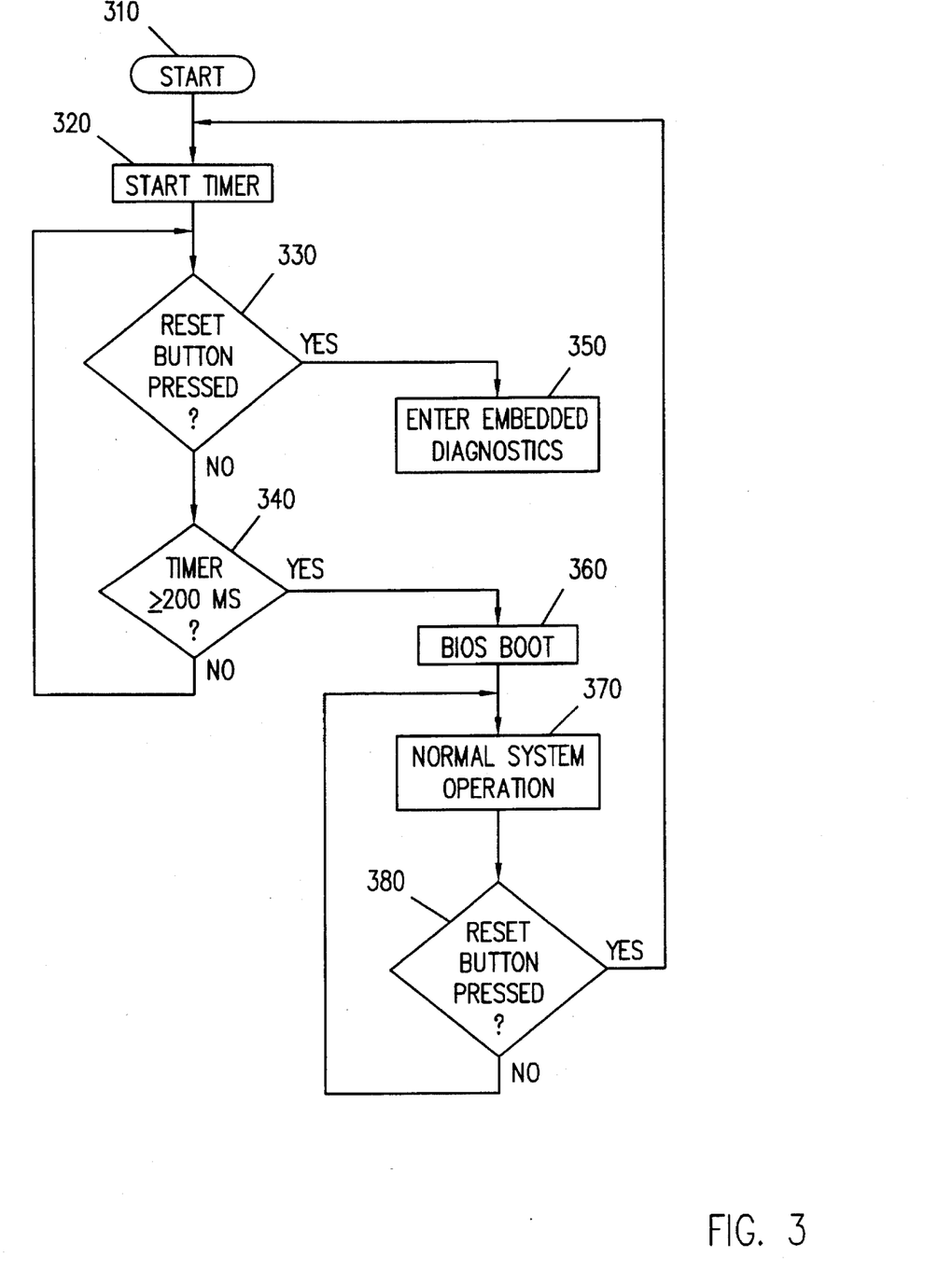
FIG. 3 illustrates a flow diagram of a procedure for entering the embedded diagnostic routines of the present invention.

Turning now to FIG. 2, illustrated is a partial block diagram of a PC architecture. Shown are a host bus 210 coupled to a central processing unit ("CPU") 220, a memory controller 230, a bus controller 240 and a video controller 250. The memory controller 230 is coupled to random access memory ("RAM") 235 and the video controller 250 is coupled to video RAM ("VRAM") 255. The bus controller 240 is coupled to an input/output ("I/O") bus 200 which, in turn, is coupled to read-only memory ("ROM") 260, a programmable interrupt controller ("PIC") 270, a real-time clock ("RTC") 280 and a universal asynchronous receive/transmit module ("UART") 290. Finally, the UART 290 is coupled to a modem 295. The modem 295 allows serial communication to occur between the CPU 220 and a remote device via a serial link (not shown), which may comprise a telephone line to a remote location, usually terminating in a terminal device or another personal computer (also not shown). Turning now to FIG. 3, illustrated as a flow diagram of a procedure for entering the remote diagnostic routines of the present invention. Execution begins at "start" block 310 when the reset button 150 of FIG. 1 is pressed a first time. As soon as the button 150 is pressed, a timer is initialized to a value representing 200 ms (block 320), within which the button 150 must again be pressed to enter diagnostics. Next, execution proceeds to decisional block 330 wherein a second button pressed is detected. If not, the timer is decremented (decisional block 340) and execution returns to the decisional block 330. If so, execution proceeds to block 350 and diagnostics are invoked.

If the timer counts a full 200 ms, execution proceeds to "BIOS boot" block 360 wherein the computer initializes and begins normal operation (block 370). If the reset button 150 is pressed during normal operation (decisional block 380), execution again proceeds to the block 320, offering another opportunity to enter remote diagnostics.

Figure 4:
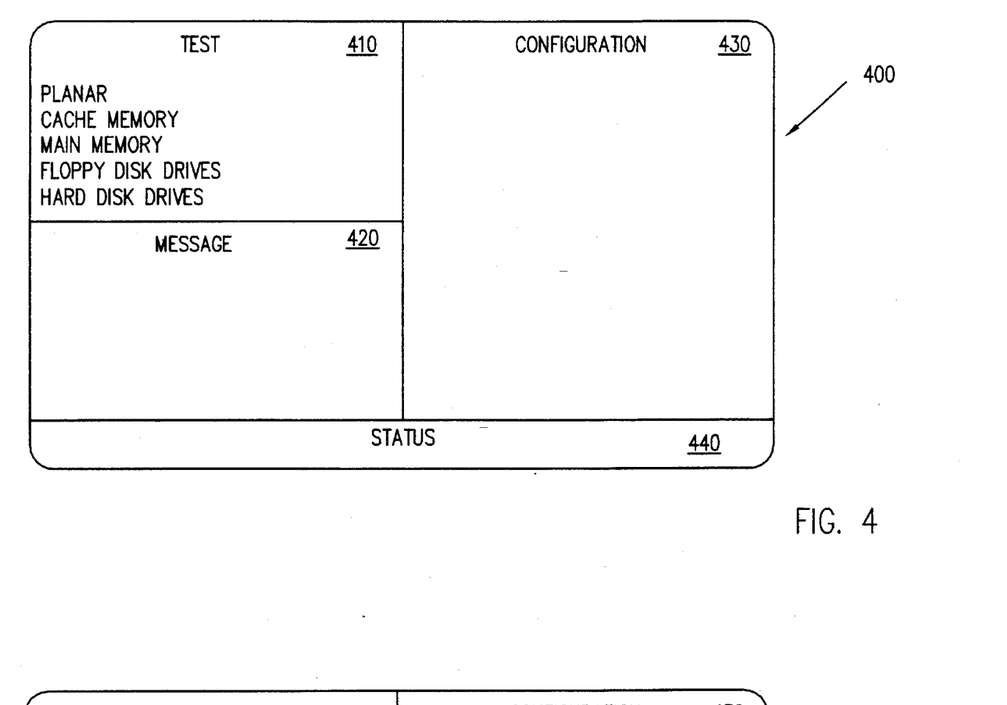
FIG. 4 illustrates an initial screen presented to a user.

Turning now to FIG. 4, illustrated is an initial screen presented to the user upon invocation of the remote diagnostics of the present invention. The screen, generally designated 400, is divided into a plurality of windows or sub-screens. A test window 410 contains a list of tests to be performed. A message window 420 contains any messages to be displayed to the user. A configuration window 430 displays the PC's configuration of components. Finally, a status window 440 indicates the status of test as they proceed.

As shown in FIG. 4, only the test window 410 is shown with any information therein. Namely, the test window 410 is shown with a list of computer components to test. "Planar" refers to the PC mother board (usually a single planar board), which contains at least the CPU and the buses and components proximate the CPU, such as timers, controllers and buffers. In many systems, the mother board also holds the video subsystem, comprising the video controller 250 and VRAM 255 of FIG. 2. The list in the test window 410 indicates the order in which the diagnostic routines of the present invention test the components in the PC.

Figure 5:
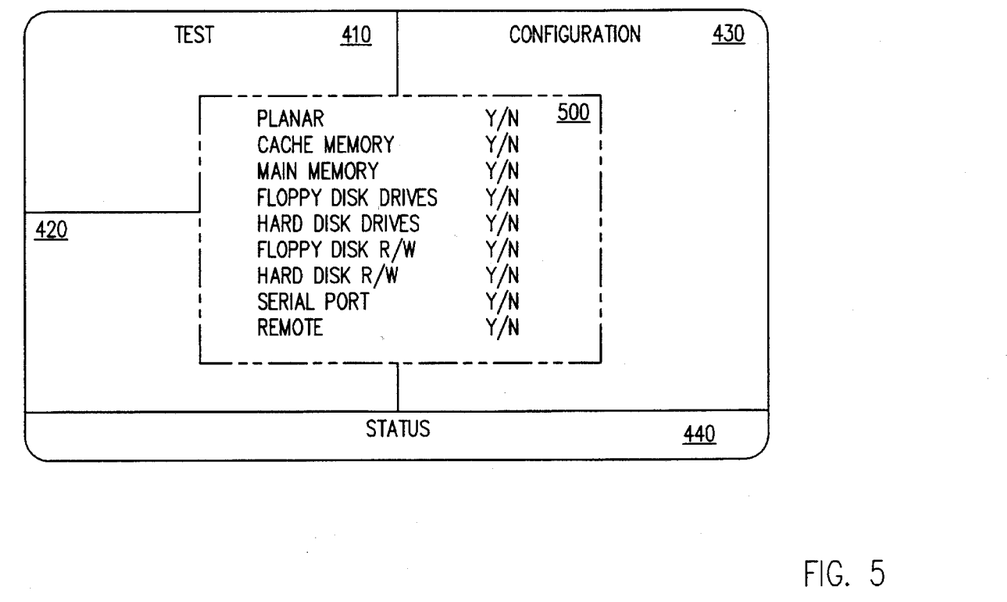
FIG. 5 illustrates a subsequent screen presented to the user.

Turning now to FIG. 5, shown is the screen 400 of FIG. 4. However, the screen 400 is shown as overlayed with a window 500 which "pops up" over the screen 400 immediately after invocation thereof. The window 500 presents a list of test options available to the user. If a functioning keyboard is detected, the user simply indicates via the keyboard which of the test to run by toggling between "yes" and "no", as shown. If the keyboard is not functioning, the user can toggle via the reset button.

One aspect of the present invention is that a last option, "remote," is only listed on the window 500 if the modem 295 of FIG. 2 is present. If the modem 295 and its associated hardware (the PIC 270 and UART 290) are functioning correctly, the modem 295 is auto-initialized so as to minimize interactivity with the user in case the keyboard is not functioning. Assuming that the modem 295 is available, the user selects remote diagnostics by answering "yes" to the "remote" option. If the user answers "yes" to the "remote" option, the user is presented with a further pop-up window, shown in FIG. 6.

Figure 6:
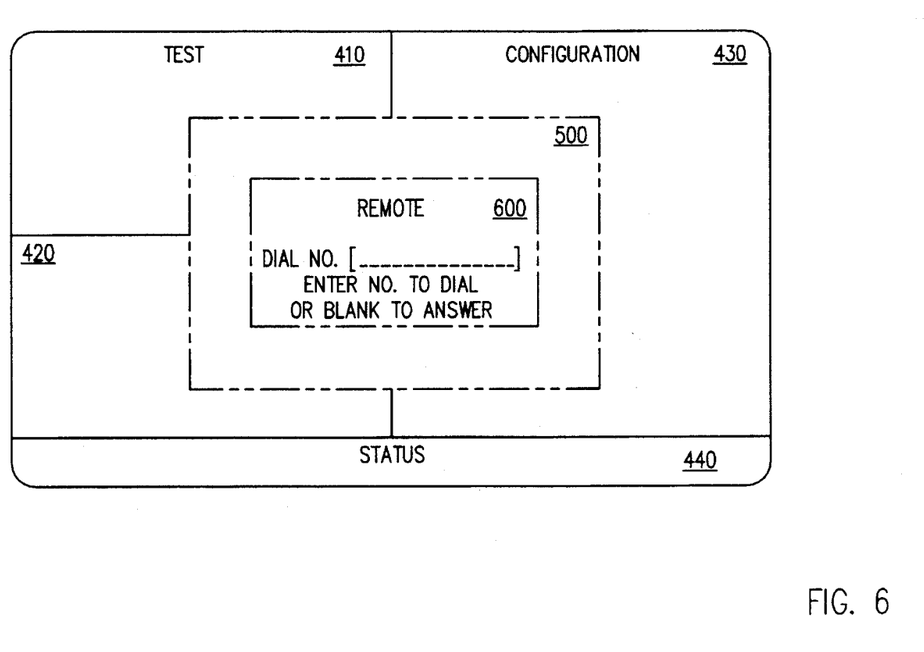
FIG. 6 illustrates yet another screen presented to the user.

Turning now to FIG. 6, illustrated is that pop-up window. The window, designated 600, contains a field in which to enter a telephone number. The user has the option to enter that number for a dial-out to a remote technician to take place or, if the user desires to receive and answer a call from the remote technician, the user simply leaves the field blank. If the user does not have access to a keyboard, the reset button 150 can be used to select a preselected number, perhaps based on the number of times the button 150 is pressed. As soon as the user has completed the field, the remote window 600 disappears, leaving the window 500 over the window 400 in its place.

Since it is assumed that the user has chosen remote diagnostics, the system now places a call to the remote technician or waits to receive a call from the remote technician. Once the PC is connected to the remote technician, the PC transmits the screen 400, with its overlying window 500, to the remote technician for remote viewing. The PC then freezes the local keyboard, preventing the user from giving further input to the diagnostic process. The window 500 is presented to the remote technician to allow the remote technician to redesignate which tests are to be performed in the diagnostic process. Once the remote technician has designated the routines to be performed, again by toggling between "yes" and "no", the window 500 disappears, leaving the screen 400, as originally presented. The PC then proceeds through the designated routines, presenting the results of each test to the remote technician via the modem and via the format of the screen 400.

The present invention, therefore, allows the remote technician to operate as if seated at the PC. This, obviously, is of great advantage, since the user is no longer forced to be involved in the diagnostic process and since the greater experience of the remote technician can be brought directly to bear to solve the problem. With the present invention, it is no longer necessary to iterate with a relatively inexperienced user to determine the nature or source of a fault. Nor is it necessary to send as many technicians into the field to service faulty PCs.

From the above, it is apparent that the present invention is the first to provide a method for remotely diagnosing faults in a PC comprising the steps of (1) confirming an existence and a proper operation of a modem coupled to the PC, the step of confirming performed in a CPU of the PC and in a diagnostic environment independent of a normal operating system of the PC, (2) receiving an indication of a selection of diagnostic routines to be performed from a remote location via the modem and (3) performing selected ones of the diagnostic routines as a function of the selection. The present invention allows an experienced technician located remotely from the computer to interact with the it as though seated in front of it, even when critical faults prevent it from booting.

Although the present invention and its advantages have been described in detail in the above-detailed description, those skilled in the art should understand that various changes, substitutions and alterations can be made herein without departing from the spirit and scope of the invention as defined by the appended claims.

What is claimed is:

1. A method of remotely diagnosing faults on a personal computer, comprising the steps of:

confirming an existence and a proper operation of a modem coupled to said personal computer, said step of confirming performed in a central processing unit (CPU) of said personal computer and in a diagnostic environment independent of a normal operating system of said personal computer;

receiving an indication of a selection of diagnostic routines to be performed from a remote location via said modem; and performing selected ones of said diagnostic routines as a function of said selection.

2. The method as recited in claim 1 further comprising the step of executing a diagnostic operating environment prior to said step of confirming, said diagnostic operating environment independent of said normal operating system and capable of visually communicating information pertaining to diagnostics of said personal computer to a user.

3. The method as recited in claim 1 further comprising the step of executing an initial diagnostic routine prior to said step of confirming, said initial diagnostic routine performing tests on said CPU and other selected core components within said personal computer.

4. The method as recited in claim 1 further comprising the step of confirming an existence and a proper operation of a universal asynchronous receive/transmit module (UART) coupling said CPU to said modem and a programmable interrupt controller (PIC) within said computer.

5. The method as recited in claim 1 further comprising the step of locally presenting, prior to said step of receiving and via said diagnostic environment, a list of options for further diagnostic routines to be executed, one of said options being remote diagnosis.

6. The method as recited in claim 1 further comprising the step of remotely presenting, prior to said step of receiving and via said diagnostic environment and said modem, said list of options.

7. The method as recited in claim 1 further comprising the step of remotely presenting, subsequent to said step of performing and via said diagnostic environment and said modem, information pertaining to execution of said selected ones of said diagnostic routines.

8. A diagnostic circuit for a personal computer, comprising:
- a central processing unit (CPU) capable of executing embedded diagnostic instructions to confirm an existence and a proper operation of a modem coupled to said personal computer, said diagnostic instructions supplying an operating environment independent of an normal operating system of said personal computer; and
- a plurality of diagnostic routines individually executable by said CPU as a function of selection from a remote location via said modem to thereby indicate, via said modem and to said remote location, a functioning of components within said personal computer.

9. The circuit as recited in claim 8 further comprising non-volatile memory capable of storing said embedded diagnostics instructions and said plurality of diagnostic routines.

10. The circuit as recited in claim 8 further comprising an initial diagnostic routine, said initial diagnostic routine performing tests on said CPU and other selected core components within said personal computer.

11. The circuit as recited in claim 8 further comprising a display device capable of locally presenting, via said operating environment, a list of options for further diagnostic routines to be executed, one of said options being remote diagnosis.

12. The circuit as recited in claim 8 further comprising a remote link including said modem and capable of remotely presenting, via said operating environment, a list of options for further diagnostic routines to be executed, said operating environment receiving an indication of a selection of diagnostic routines to be performed from a remote location via said modem.

13. The circuit as recited in claim 8 further comprising a remote link including said modem and capable of remotely presenting, via said operating environment, information pertaining to execution of said selected ones of diagnostic routines to be performed.

14. The circuit as recited in claim 8 further comprising a universal asynchronous receive/transmit module (UART) coupling said CPU to said modem and a programmable interrupt controller (PIC) within said computer.

15. A method of remotely diagnosing faults on a personal computer, comprising the steps of:
- executing a diagnostic operating environment, said diagnostic operating environment independent of a normal operating system of said personal computer and capable of visually communicating information pertaining to diagnostics of said personal computer to a user;
- executing an initial diagnostic routine, said initial diagnostic routine performing tests on a central processing unit (CPU) and other selected core components within said personal computer;
- confirming an existence and a proper operation of a modem coupled to said personal computer;
- locally presenting, via said diagnostic operating environment, a list of options for further diagnostic routines to be executed, one of said options being remote diagnosis;
- remotely presenting, via said diagnostic operating environment and said modem, said list of options;
- receiving an indication of a selection of diagnostic routines to be performed from a remote location via said modem;
- performing selected ones of said diagnostic routines as a function of said selection; and
- remotely presenting, via said diagnostic operating environment and said modem, information pertaining to execution of said selected ones of said diagnostic routines.

16. The method as recited in claim 15 further comprising the step of confirming an existence and a proper operation of a universal asynchronous receive/transmit module (UART) coupling said CPU to said modem and a programmable interrupt controller (PIC) within said computer.

17. The method as recited in claim 15 further comprising the step of preventing local input once said remote location has coupled to said personal computer.

18. The method as recited in claim 15 wherein said list of options includes said remote diagnosis option only when said initial diagnostic routine detects a presence of said modem.

19. A system for remote diagnosis of a personal computer, comprising:
- non-volatile memory within said personal computer containing a diagnostic operating environment, said diagnostic operating environment independent of a normal operating system of said personal computer and capable of visually communicating information pertaining to diagnostics of said personal computer to a user;
- a central processing unit (CPU) coupled to said non-volatile memory and capable of executing an initial diagnostic routine, said initial diagnostic routine performing tests on said CPU and other selected core components within said personal computer, said initial diagnostic routine further confirming an existence and a proper operation of a modem coupled to said personal computer;
- a display device capable of locally presenting, via said diagnostic operating environment, a list of options for further diagnostic routines to be executed, one of said options being remote diagnosis; and
- a remote link including said modem and capable of remotely presenting, via said diagnostic operating environment, said list of options, said diagnostic operating environment receiving an indication of a selection of diagnostic routines to be performed from a remote location via said modem, said CPU performing selected ones of said diagnostic routines as a function of said selection, said diagnostic operating environment remotely presenting, via said diagnostic operating environment and said modem, information pertaining to execution of said selected ones of said diagnostic routines.

20. The system as recited in claim 19 wherein said initial diagnostic routine confirms an existence and a proper operation of a universal asynchronous receive/transmit module (UART) coupling said CPU to said modem and a programmable interrupt controller (PIC) within said computer.

21. The system as recited in claim 19 wherein local input is prevented once said remote location has coupled to said personal computer.

22. The system as recited in claim 19 wherein said list of options includes said remote diagnosis option only when said initial diagnostic routine detects a presence of said modem.

* * * * *